(12) United States Patent
Matsumoto et al.

(10) Patent No.: US 6,785,978 B2
(45) Date of Patent: Sep. 7, 2004

(54) OIL LEVEL GAUGE GUIDE DEVICE

(75) Inventors: Yukitomo Matsumoto, Yamato (JP);
Shigehiro Matsumoto, Hadano (JP);
Kenji Kurihara, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/272,289

(22) Filed: Oct. 17, 2002

(65) Prior Publication Data

US 2003/0121168 A1 Jul. 3, 2003

(Under 37 CFR 1.47)

(30) Foreign Application Priority Data

Oct. 19, 2001 (JP) ........................ 2001-321928

(51) Int. Cl.⁷ ............................................. G01F 23/04
(52) U.S. Cl. ........................................................ 33/726
(58) Field of Search ........................... 33/645, 613, 722, 33/726, 730, 728, 725

(56) References Cited

U.S. PATENT DOCUMENTS

| | | | | |
|---|---|---|---|---|
| 4,155,167 A | * | 5/1979 | DeLano ........................ | 33/716 |
| 4,510,690 A | * | 4/1985 | Attler ........................... | 33/726 |
| 4,780,925 A | * | 11/1988 | Sherman ...................... | 15/220.4 |
| 4,894,926 A | * | 1/1990 | Suhr ............................. | 33/726 |
| 4,942,669 A | * | 7/1990 | Schnedl ....................... | 33/725 |
| 5,025,569 A | * | 6/1991 | Lalevee, Sr. ................ | 33/726 |
| 5,042,167 A | * | 8/1991 | Link ............................ | 33/725 |
| 5,099,584 A | * | 3/1992 | Williams ..................... | 33/725 |
| 5,154,005 A | * | 10/1992 | Lalevee, Sr. ................ | 33/726 |
| 5,241,753 A | * | 9/1993 | Lalevee, Sr. ................ | 33/726 |
| 5,992,037 A | * | 11/1999 | Klotz .......................... | 33/722 |
| 6,035,908 A | * | 3/2000 | Hoffmann ................... | 141/331 |
| 6,289,601 B1 | * | 9/2001 | Bricker ....................... | 33/726 |
| 6,449,865 B1 | * | 9/2002 | Heckman .................... | 33/726 |

FOREIGN PATENT DOCUMENTS

| | | | | |
|---|---|---|---|---|
| JP | 7-217421 A | | 8/1995 | |
| JP | 07217421 A | * | 8/1995 | ................ 33/726 |
| JP | 2000-74035 A | | 3/2000 | |
| JP | 2001-124045 A | | 5/2001 | |

\* cited by examiner

*Primary Examiner*—Christopher W. Fulton
*Assistant Examiner*—Travis Reis
(74) *Attorney, Agent, or Firm*—Shinjyu Global IP Counselors, LLP (57) ABSTRACT

An oil level gauge guide device is coupled to an engine to make the operation of inserting an oil level gauge easier. The oil level gauge guide device has a guide body and a fastening portion. The guide body is generally funnel shaped and narrows gradually from a first open end toward a second open end. The fastening portion fastens the guide body to a cylinder head of main engine body in such a manner that the second open end of the guide body faces an oil level gauge insertion opening of the cylinder head into which the oil level gauge to be inserted.

30 Claims, 8 Drawing Sheets

OIL LEVEL GAUGE GUIDE DEVICE

BACKGROUND OF THE INVENTION

1. Field of the Invention

The present invention relates to an oil level gauge guide device that makes it easier to insert an oil level gauge of an internal combustion engine.

2. Background Information

Generally, internal combustion engines for vehicles have an oil level gauge that detects the level and degree of dirtiness of the engine oil. One example of such an oil level gauge is disclosed in Japanese Laid-Open Patent Publication No. 7-217421. The oil level gauge usually has an elongated thin metal insertion part with a steel handle fixed to one end of the insertion part. Typically, the oil level gauge is inserted directly into an oil gauge insertion opening that opens at an upper surface of the cylinder head of the main engine body. The oil gauge insertion opening is sized to be slightly larger than the width of the insertion part of the oil level gauge. Thus, the oil gauge insertion opening is typically quite small.

In view of the above, it will be apparent to those skilled in the art from this disclosure that there exists a need for a guide device that aids in the insertion of the oil level gauge into the oil gauge insertion opening. This invention addresses this need in the art as well as other needs, which will become apparent to those skilled in the art from this disclosure.

SUMMARY OF THE INVENTION

It has been discovered that this kind of the oil level gauge can be extremely difficult to insert into the oil level gauge insertion opening. One reason is that the inside dimension or diameter of the oil gauge insertion opening cannot be made very large because of the layout of the oil gauge insertion opening and because it is necessary for a cap part of a rubber seal of the oil level gauge to close the oil gauge insertion opening in a liquid-tight manner when the oil level gauge is installed in the cylinder head. A second reason is that, due to the layout of the oil pan and the oil gauge insertion opening, it is easy for the tip of the oil level gauge to move about if the insertion part of the oil level gauge is long. A third reason is that, it is difficult to see the oil gauge insertion opening when engine components, such as the rocker cover, the intake duct and the solenoid, are arranged in the vicinity of the oil gauge insertion opening and the oil level gauge, and thus, block the field of view.

An object of the present invention is to provide an oil level guide device that makes the operation of inserting the oil level gauge easier.

The foregoing object can basically be attained by providing an oil level gauge guide comprising a guide body and a fastening portion. The guide body includes a wide first open end and a narrow second open end. The fastening portion includes a first part and a second part that is coupled to the guide body. The first part is configured to be coupled to a main engine body of an internal combustion engine in such a manner that the second open end faces an oil level gauge insertion opening of the main engine body through which an oil level gauge is inserted.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
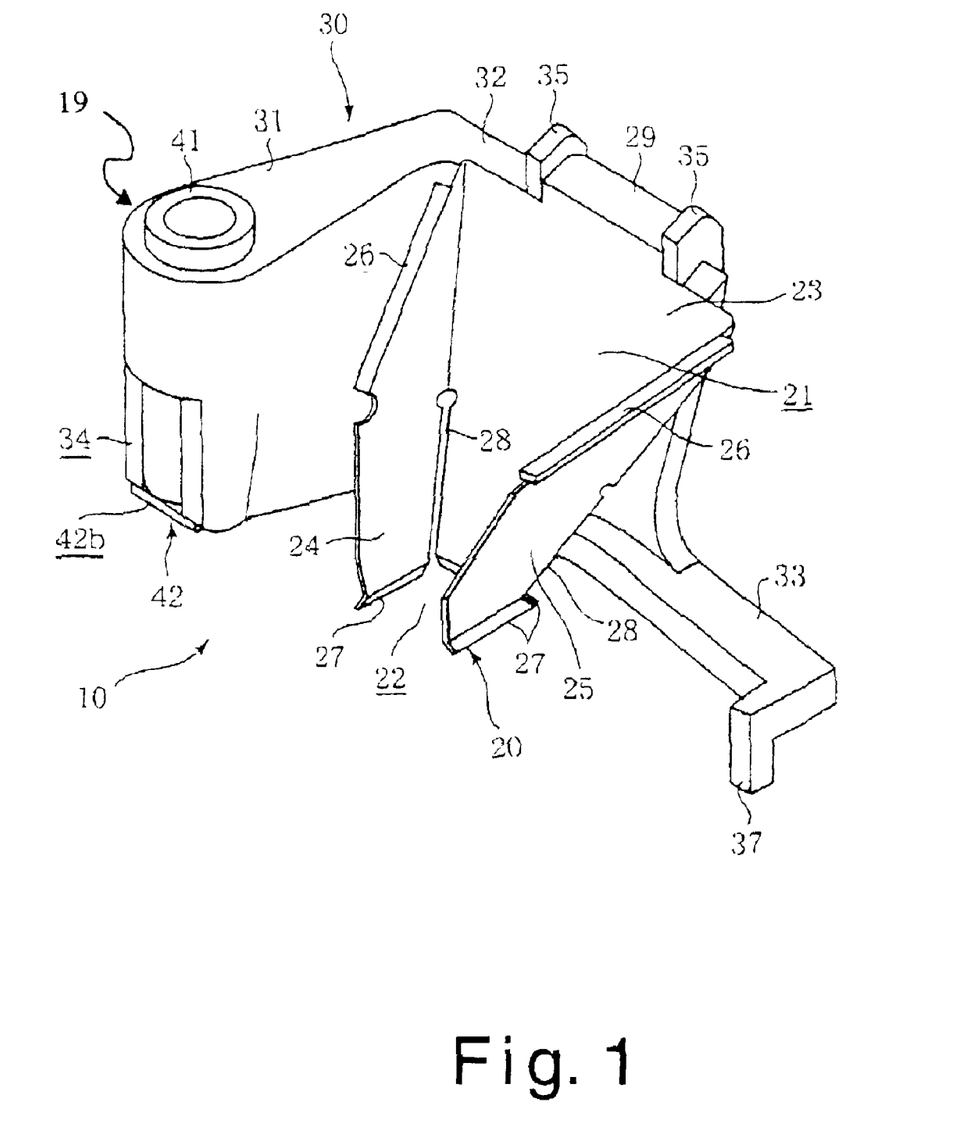
FIG. 1 is a front perspective view an oil level gauge guide device in accordance with one embodiment of the present invention.
Figure 2A:
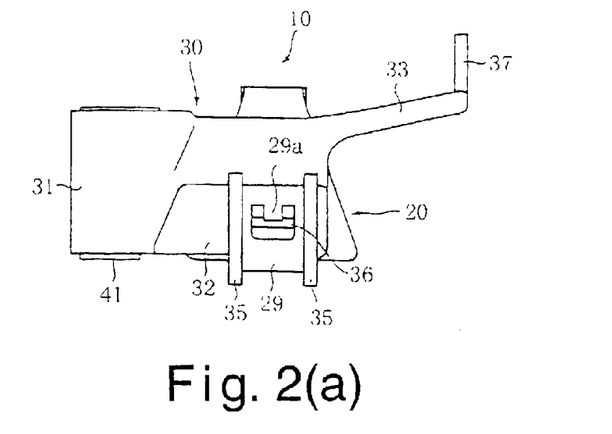
FIG. 2(a) is a rear elevational view of the oil level gauge guide device illustrated in FIG. 1.
Figure 2B:
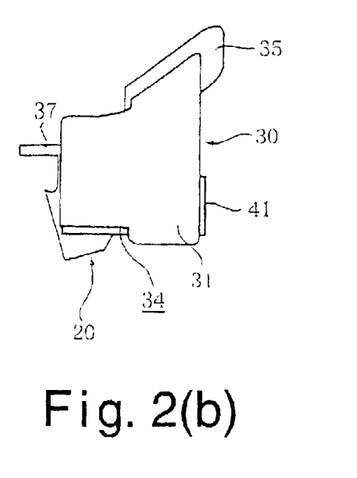
FIG. 2(b) is a side elevational view of the oil level gauge guide device illustrated in FIG. 1.
Figure 2C:
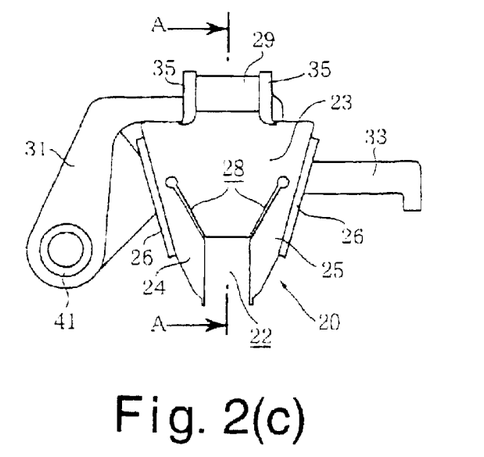
FIG. 2(c) is a top plan view of the oil level gauge guide device illustrated in FIG. 1.
Figure 2D:
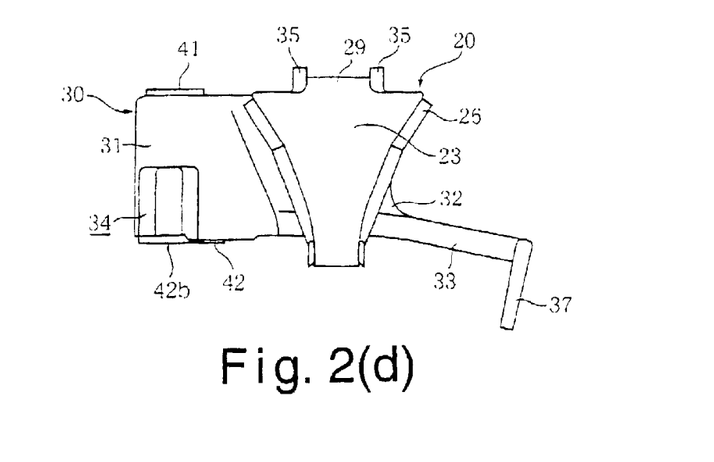
FIG. 2(d) is a front elevational view of the oil level gauge guide device illustrated in FIG. 1.
Figures 8A, 8B:
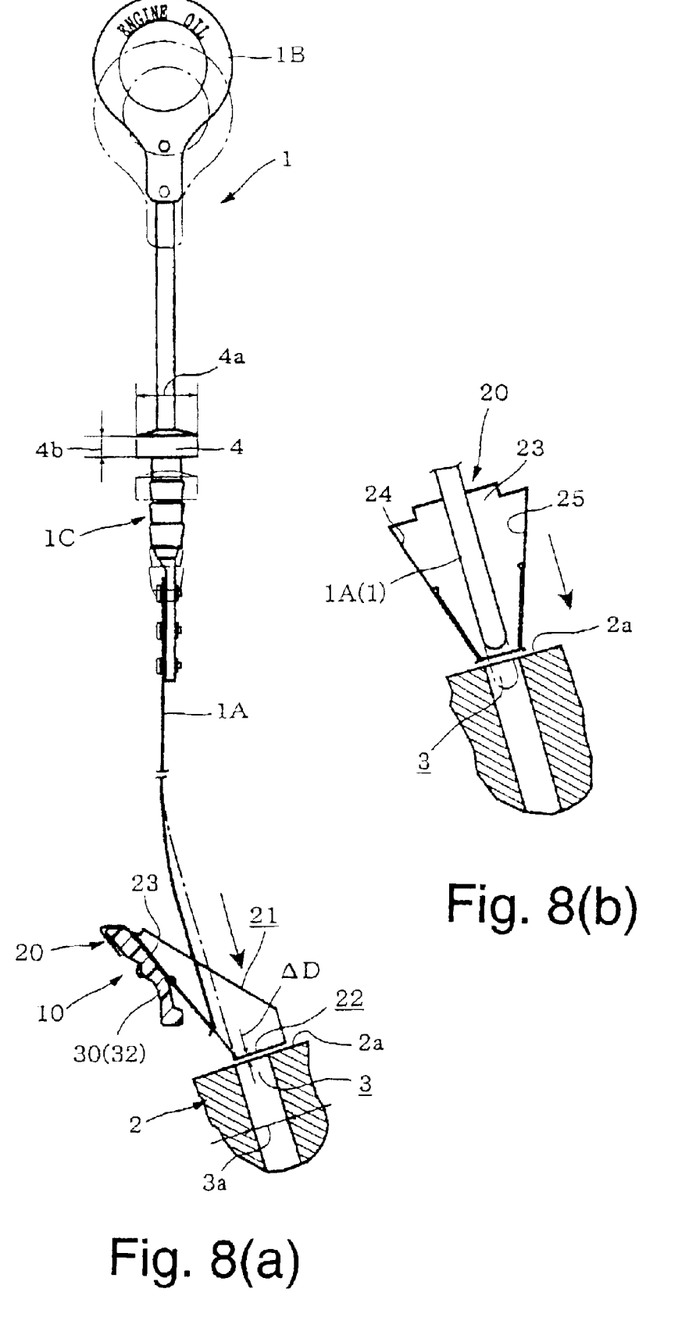
FIG. 8(a) is a side illustration of the oil level gauge that illustrates the conditions that exist when the oil level gauge is being inserted.
FIG. 8(b) is an enlarged partial illustration of the oil level gauge that illustrates the conditions that exist when the oil level gauge is being inserted.
Figure 9A:
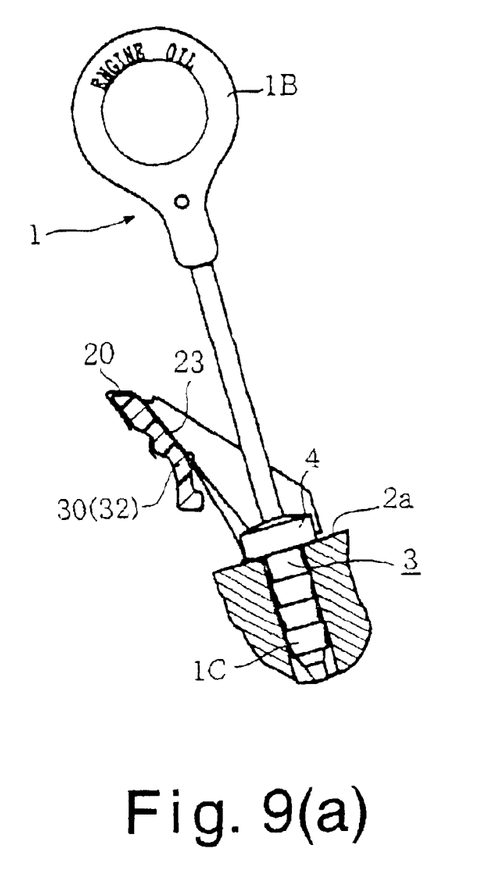
FIG. 9(a) is a side illustration of the oil level gauge that illustrates the conditions that exist when the oil level gauge has been inserted.
Figure 9B:
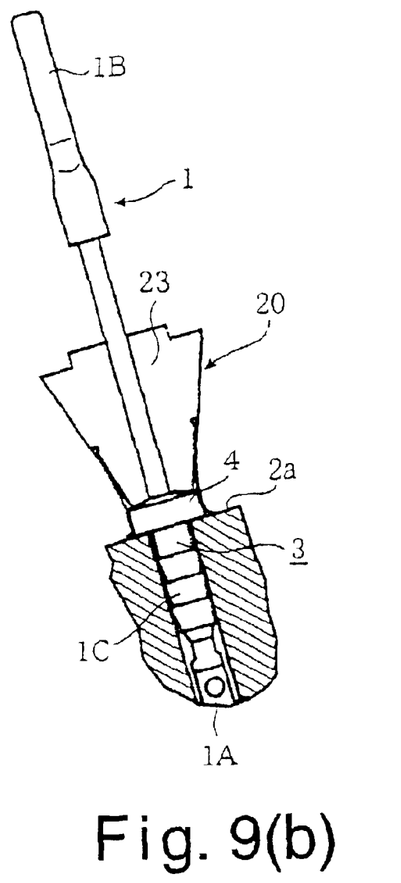
FIG. 9(b) is an enlarged partial illustration of the oil level gauge that illustrates the conditions that exist when the oil level gauge has been inserted.

Referring initially to FIG. 1, an oil level gauge guide device 10 is illustrated in accordance with a first embodiment of the present invention. As shown in FIGS. 8 and 9, the oil level gauge 1 for use with an internal combustion engine basically includes a long and flexible insertion part 1A, a steel handle part 1B fixed to one end of the insertion part 1A, and a rubber seal 1C disposed between the insertion part 1A and the handle part 1B. The insertion part 1A is preferably made of stainless steel (SUS). The handle part 1B is gripped by the operator to insert the insertion part 1A into the engine through an oil gauge insertion opening 3 formed on an upper surface 2a of the cylinder head or main engine body 2.

As best seen in FIGS. 9(a) and 9(b), the rubber seal 1C having a cap part 4 that closes the oil level gauge insertion opening 3 in a liquid-tight manner. The cap part 4 of the rubber seal 1C has a generally columnar shape whose outside diameter 4a is larger than the inside diameter 3a of the oil level gauge insertion opening 3 so that it sits against the upper surface 2a of the cylinder head 2 and closes the oil level gauge insertion opening 3 in a liquid-tight manner when the oil level gauge 1 is installed in the cylinder head 2. Consequently, if the inside diameter of the second open end 22 is set to be substantially as large as the outside diameter of the cap part 4, the opening of the second open end 22 will be larger than the oil level gauge insertion opening 3 and the ease of the gauge insertion operation will decline. Therefore, in order to guide the oil level gauge 1 well, it is preferred that the inside diameter of the second open end 22 be substantially the same as the inside diameter of the oil level gauge insertion opening 3 when the oil level gauge 1 is not installed.

Figure 6:
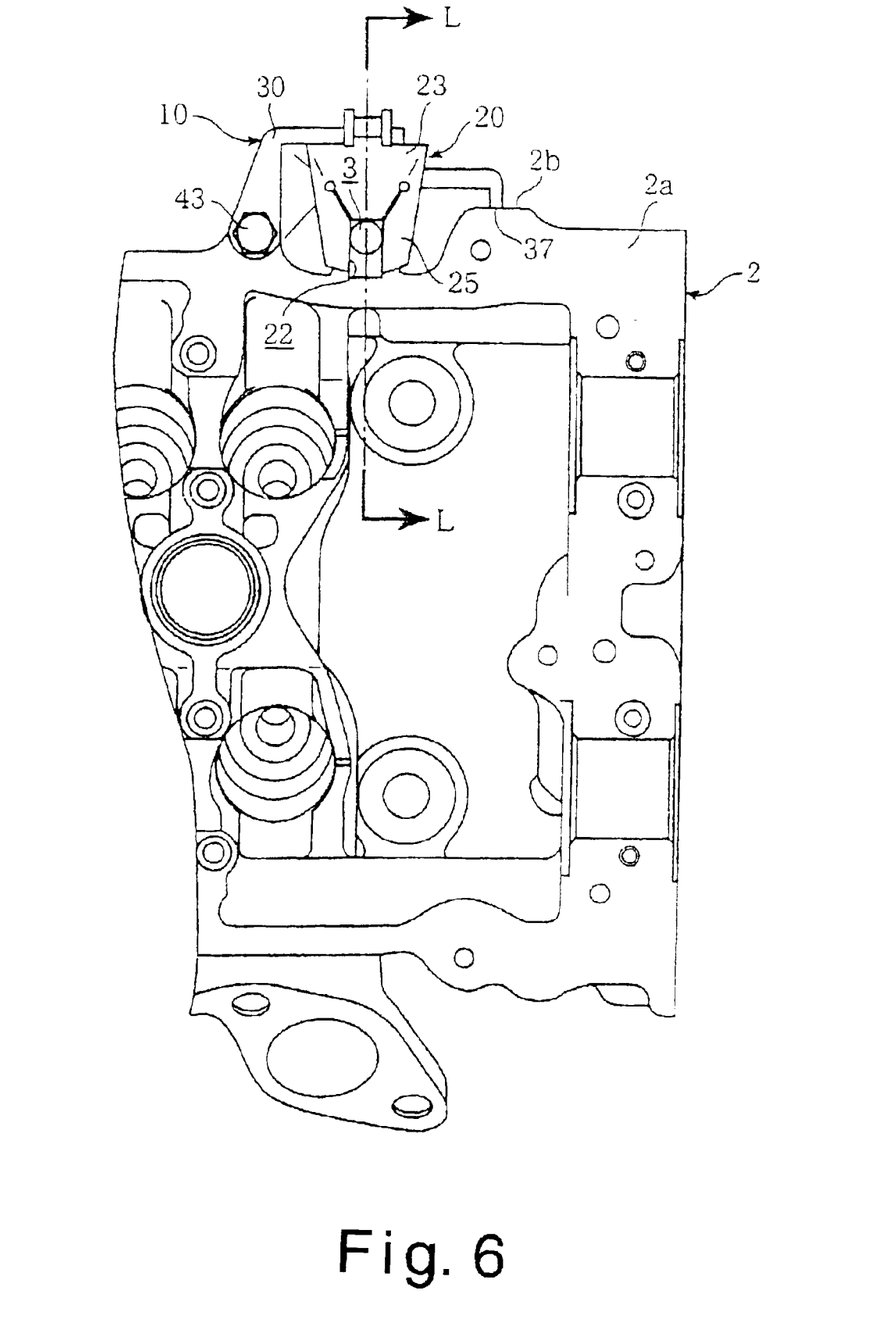
FIG. 6 is a top view of a cylinder head installed on the oil level gauge guide device illustrated in FIGS. 1–5 in accordance with the present invention.

As shown in FIGS. 1 and 2(a)–2(d), the oil gauge guide device 10 basically comprises a fastening portion 19 and a guide body 20 that is generally funnel shaped. The guide body 20 narrows gradually from a wide first open end 21 toward a narrow second open end 22. The fastening portion 19 fastens the guide body 20 to the cylinder head 2 in such a manner that the second open end 22 faces the oil gauge insertion opening 3 with a prescribed gap ΔD (FIG. 8) formed between the oil gauge insertion opening 3 and the second open end 22 of the guide body 20. The fastening portion 19 has a single, unitary one-piece resin body 30, a single, unitary one-piece metal collar 41, a single, unitary one-piece metal ring 42 and a single mounting bolt 43 as best seen in FIG. 6. The guide body 20 catches onto the resin body 30. The metal collar 41 is press-fitted into the resin body 30, while the metal ring 42 is disposed between the bottom surface of the metal collar 41 and the upper surface 2a of the cylinder head 2. The metal ring 42 has a claw part 42a that is formed by bending and press-fitted into the resin body 30. The mounting bolt 43 (see FIG. 6) fastens and immobilizes the metal collar 41 and the metal ring 42 to the cylinder head 2. In short, a simple single-point fastening arrangement is achieved in which the resin body 30 onto which the guide body 20 is caught can be securely fastened to the cylinder head 2 with a single fastener, e.g., the mounting bolt 43.

Figure 7:
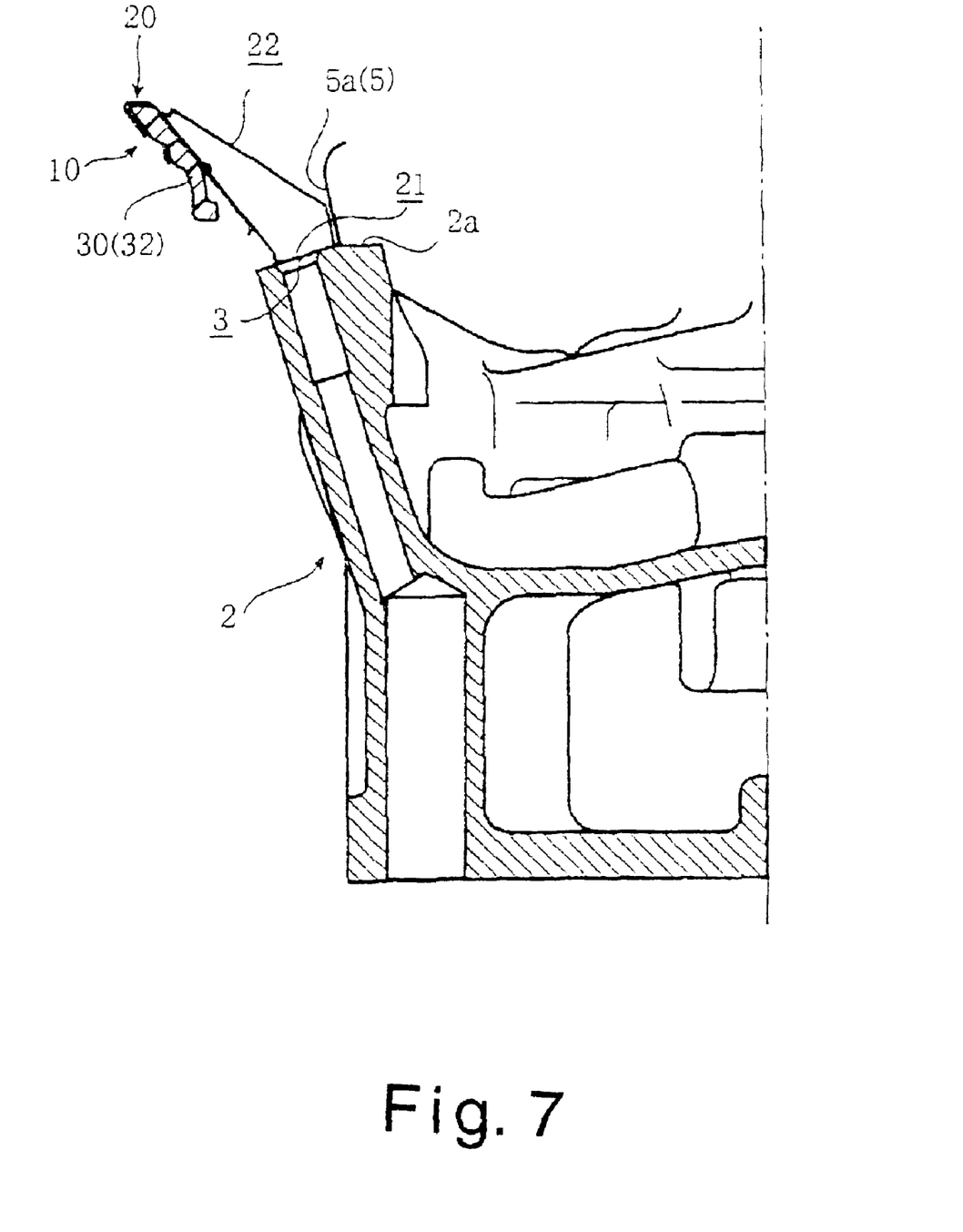
FIG. 7 is a cross sectional view of the cylinder head installed on the oil level gauge guide device as seen along section line L—L of FIG. 6.

The guide body 20 is preferably made from a one-piece, unitary of sheet material such as a thin sheet of stainless steel (SUS) that has been formed by bending. The guide body 20 basically includes a flat first slanted surface part 23, a flat second slanted surface part 24 and a flat third slanted surface part 25. The second and third slanted surface parts 24 and 25 are bent at substantially right angles from the sides of the first slanted surface part 23 and slanted such that they become closer to each other as they approach the second open end 22. These three slanted surface parts 23 to 25 are installed such that they enclose the lateral face 5a (see FIG. 7) of the rocker cover 5. In short, the guide body 20 has a generally C-shaped (channel-shaped) cross section and is shaped approximately like a quadrangular pyramid whose opening area narrows gradually toward the second open end 22 and from which the side closest to lateral face 5a of the rocker cover 5 has been eliminated.

Therefore, when the oil level gauge 1 is inserted into the oil level gauge insertion opening 3, the tip or free end of the oil level gauge 1 is first inserted through the wide first open end 21 of the guide body 20. Thus, the oil gauge guide device 10 improves the ease of inserting the oil level gauge 1 because the tip of the oil level gauge 1 is guided to the oil level gauge insertion opening 3 by the guide body 20. In other words, this arrangement provides excellent visibility and ease of insertion. As shown in FIGS. 8(a) and 8(b), the oil level gauge 1 can be inserted smoothly into the oil level gauge insertion opening 3 while sliding the tip thereof along the first slanted surface part 23. Even if the tip of the oil level gauge 1 moves laterally, the movement will be restricted by the second slanted surface part 24 and the third slanted surface part 25, and thus, the tip will be guided reliably to the oil level gauge insertion opening 3. Thus, the oil level gauge 1 that is long and flexible can be guided easily, quickly, and reliably into the oil level gauge insertion opening 3. In other words, the oil gauge guide device 10 substantially improves the ease of the insertion operation the oil level gauge 1 into the oil level gauge insertion opening 3.

Each of the upper ends of the second and third slanted surface parts 24 and 25 has a first flange 26 that is bent outward from the second and third slanted surface parts 24 and 25 that form the wide opening of the first open end 21. The first flanges 26 prevent injury to the worker and damage to the rubber seal 1C. The first flanges 26 also improve the durability of the guide body 20 by shifting the resonance point of the guide body 20 upward and out of the region of vibrations that occur during normal use. Each of the three slanted surface parts 23 to 25 also has a second flange 27 that is bent outward from the narrow opening of the second open end 22. These second flanges 27 prevent the rubber seal 1C (which includes the cap part 4) from being damaged when the oil level gauge 1 is inserted and removed.

As shown in FIG. 6, the second open end 22 is set to have an inside diameter or dimension (smallest dimension of the opening) substantially equal to the inside diameter or dimension 3a of the oil level gauge insertion opening 3 when the oil level gauge 1 is not inserted. Thus, the oil level gauge insertion opening 3 is neither excessively nor insufficiently exposed. More specifically, the three side portions of the three slanted surface parts 23 to 25 that constitute the second open end 22 are disposed in positions that are substantially aligned with the outer periphery of the oil level gauge insertion opening 3. Therefore, when the oil level gauge 1 is inserted, the tip of the oil level gauge 1 is guided reliably to the oil level gauge insertion opening 3 (without deviating from the oil level gauge insertion opening 3) after passing through the second open end 22.

As shown in FIGS. 9(a) and 9(b), the cap part 4 has an outside diameter or dimension 4a that is larger than the inside diameters or dimensions of both the oil level gauge insertion opening 3 and the second open end 22. Thus, when the oil level gauge 1 has been inserted completely, the cap part 4 deforms the bottom part (vicinity of the second open end 22) of the guide body 20 elastically in the direction of expanding the opening by pushing outward and closes the oil level gauge insertion opening 3 in a liquid-tight manner. In order to allow this elastic deformation of the guide body 20, the guide body 20 is made of a spring material (e.g., stainless steel) and, as shown in FIGS. 1 and 2, has a pair of slits 28 that open toward the second open end 22. The one of the slits 28 is provided in the bent part between the first slanted surface part 23 and the second slanted surface part 24, while the other slit 28 is provided in the bent part between the first slanted surface part 23 and the third slanted surface part 25. In short, the guide body 20 is made so that its bottom part (vicinity of the second open end 22) can deform elastically in the direction of expanded opening. As a result, the operation of inserting the oil level gauge 1 can be made easier and the sealing of the oil level gauge insertion opening 3 by the cap part 4 can be ensured.

Consequently, if the inside diameter or dimension of the second open end 22 were set to be substantially equal to the outside diameter of the cap part 4, then the opening of the second open end 22 would be larger than the opening of the oil level gauge insertion opening 3 and the ease of the insertion operation of gauge 1 would decrease. Therefore, it is preferred that the inside diameter of the second open end 22 be substantially the same as the inside diameter of the oil level gauge insertion opening 3 when the oil level gauge 1 is not installed. In such a case, it is preferred that the guide body 20 be made so that the cap part 4 can elastically deform the guide body 22 to an appropriate degree in the direction of expanding the opening as mentioned above.

In order to prevent water and oil from collecting inside the guide body 20, it is preferred that a prescribed gap (clearance) ΔD be provided between the second open end 22 and the rim of the oil level gauge insertion opening 3 at the upper surface 2a of the cylinder head 2. Thus, the guide body 20 is fastened by the fastening portion 19 in such a manner that the prescribed gap ΔD is provided between the second open end 22 and the rim of the oil level gauge insertion opening 3. The gap ΔD is set to a value (e.g., approximately 1.5 mm) smaller than the thickness or dimension 4b of the cap part 4 so that the cap part 4 of the oil level gauge 1 does not separate from the guide body 20.

Figure 3:
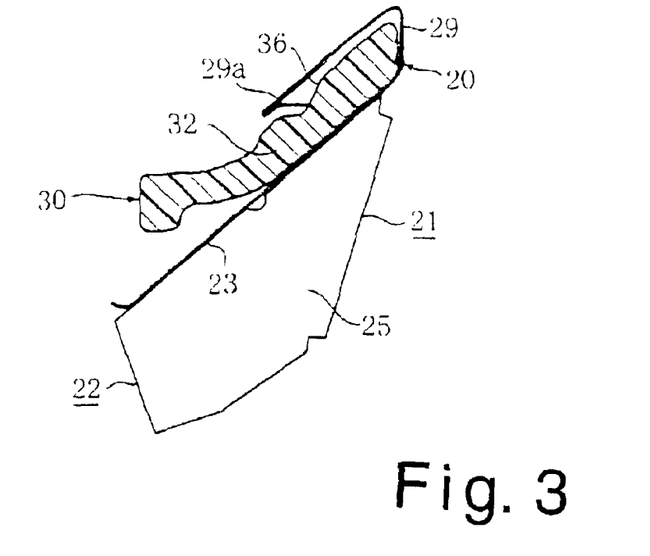
FIG. 3 is a cross-sectional view of the oil level gauge guide device as seen along section line A—A of FIG. 2(c)

The guide body 20 also includes a clip or catching part 29 that extends from the upper rim of the second slanted surface part 24. The catching part 29 is a hook shaped member that hooks onto the fastening portion 19. The catching part 29 is preferably made as a one-piece, unitary part of the guide body 20 that has been formed by bending. Preferably, the catching part 29 is provided with a claw piece 29a to retain the guide body 20 on the fastening portion 19. The claw piece 29a is bent towards the second slanted surface part 24 to engage the fastening portion 19 as seen in FIG. 3 and explained below in more detail.

Next, the fastening portion 19 will be described in more detail. The resin body 30 is molded as a single unit out of a lightweight, inexpensive synthetic resin that allows easy manufacture. The guide body 20 hooks onto the fastening portion 19 as seen in FIG. 3. The resin body 30 basically includes a first wall part 31, a second wall part 32 and a rotation stopping part 33.

The first wall part 31 has a bore that is generally parallel to the guide opening of the guide body 20, which receives the cylindrical metal collar 41 via press fit. A cutout part 34 is formed in the first wall part 31 that prevents interference with rocker cover 5 and that exposes a portion of the metal collar 41.

The second wall part 32 is extends substantially perpendicular to the first wall part 31 and has the catching part 29 of the guide body 20 coupled thereto. The second wall part 32 is slanted and curved so as to follow the first slanted surface part 23. The second wall part 32 also has a pair of protruding guide parts 35 and a recessed part 36 (FIG. 3). The protruding guide parts 35 restrict motion (shifting) of the guide body 20 by engaging both edges of the catching part 29. The recessed part 36 (FIG. 3) receives the claw piece 29a of the catching part 29 to retain the guide body 20 on the second wall part 32 of the fastening portion 19.

The rotation stopping part 33 is formed so as to extend from the second wall part 32. The rotation stopping part 33 has an abutting surface part 37 that is formed on the tip of the rotation stopping part 33 by bending. The rotation stopping part 33 is configured and arranged relative to the rest of the fastening portion 19 to firmly abuts against the lateral surface 2b of the cylinder head 2 when the mounting bolt 43 is tightened by turning it clockwise (clockwise in FIG. 6). In other words, the abutting surface part 37 is formed to extend sufficiently toward the lower part of the cylinder head 2 so that it reliably engages with the lateral surface 2b of the cylinder head 2.

Figure 4:
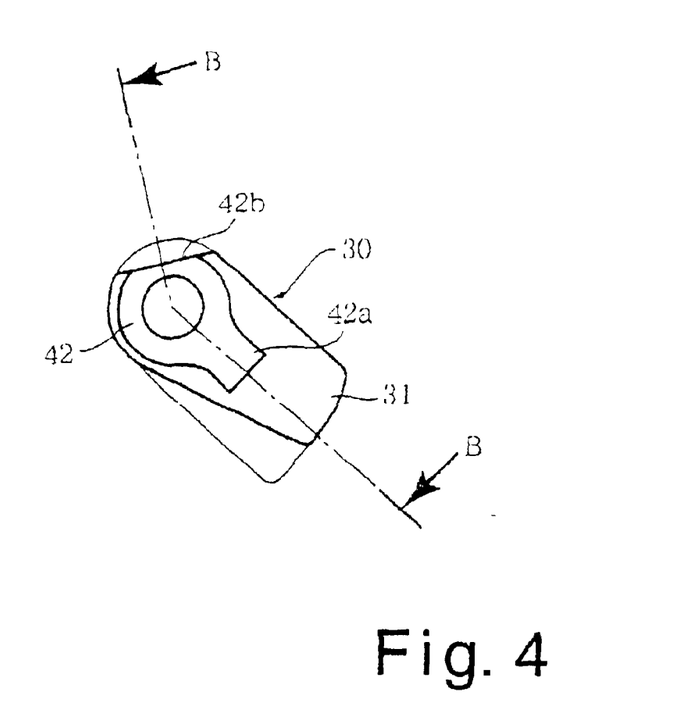
FIG. 4 is a partial bottom view of the oil level gauge guide device illustrated in FIGS. 1–3.
Figure 5:
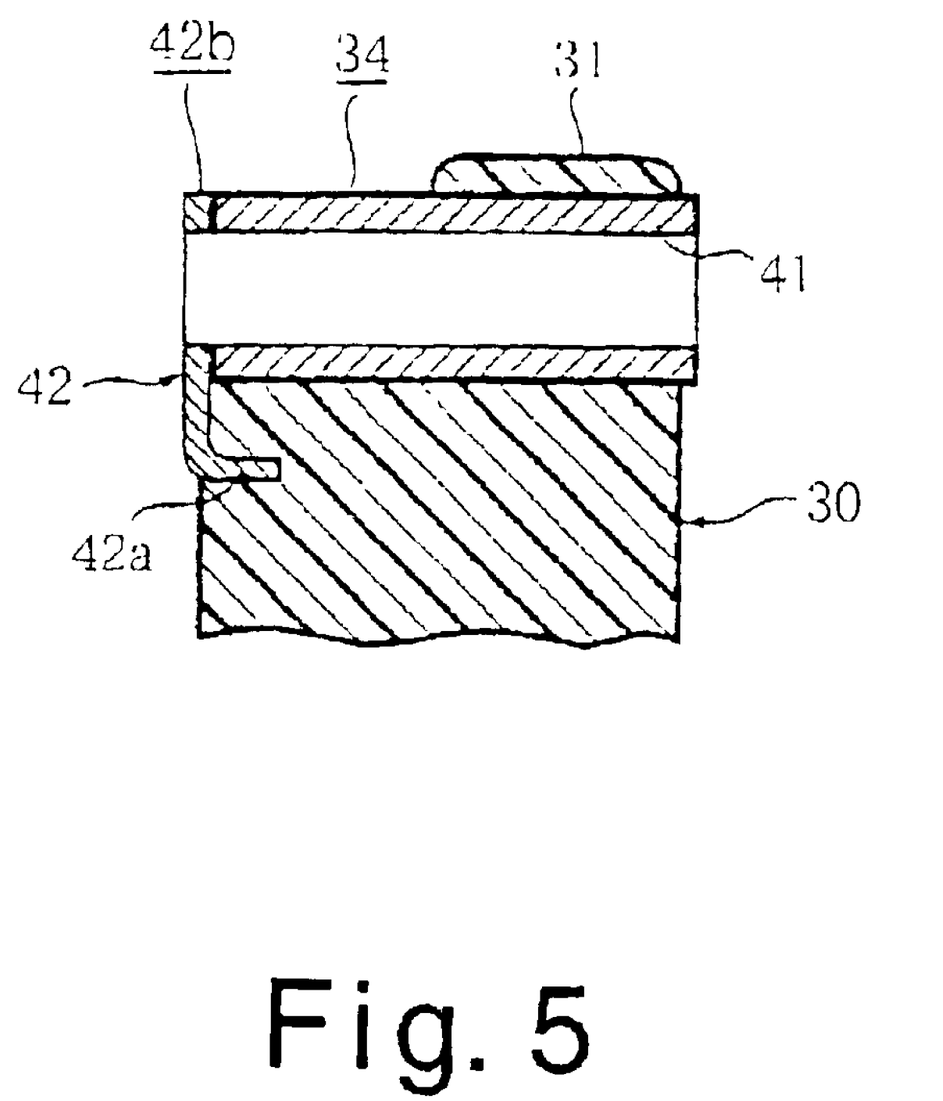
FIG. 5 is a cross sectional view of the oil level gauge guide device illustrated in FIGS. 1–4 as seen along section line B—B of FIG. 4.

A cutout part 42b (see FIG. 4) is formed in the metal ring 42 (similarly to the resin body 30) to avoid interference with the rocker cover 5. As shown in FIG. 5, the claw part 42a of the metal ring 42 is pressure fitted into the first wall part 31 at a position separated from the axial center of the metal collar 41.

Consequently, when the mounting bolt 43 is tightened clockwise, the metal collar 41 and the metal ring 42 are firmly fastened to and immobilized against the cylinder head 2 and the abutting surface part 37 of the rotation stopping part 33 firmly abuts against the lateral surface 2b of the cylinder head 2 such that the resin body 30 is held steady. The claw part 42a of the metal ring 42, which is pressure fitted into the resin body 30, prevents the resin body 30 from rotating (counterclockwise) with respect to the metal collar 41 and the metal ring 42.

The oil level gauge guide device 10 of the present invention can markedly improve the ease of inserting the oil level gauge 1. The oil level gauge guide device 10 is also advantageous in terms of weight and cost because it basically comprises the guide body 20 which is preferably made of bent sheet metal and the resin body 30 which is preferably made of lightweight and inexpensive resin. Furthermore, the oil level gauge guide device 10 is very easy to mount to the cylinder head 2 because it can be fastened to the cylinder head 2 with a single the mounting bolt 43. The oil level gauge guide device 10 also exhibits various other operational effects discussed previously.

As used herein, the following directional terms "forward, rearward, above, downward, vertical, horizontal, below and transverse" as well as any other similar directional terms refer to those directions of a vehicle equipped with the oil level gauge guide device 10 of the present invention. Accordingly, these terms, as utilized to describe the present invention should be interpreted relative to a vehicle equipped with the oil level gauge guide device 10 of the present invention.

Moreover, terms that are expressed as "means-plus function" in the claims should include any structure that can be utilized to carry out the function of that part of the present invention.

The terms of degree such as "generally", "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2001-321928. The entire disclosure of Japanese Patent Application No. 2001-321928 is hereby incorporated herein by reference.

While one selected embodiment has been chosen to illustrate the present invention, it will be apparent to those skilled in the art from this disclosure that various changes and modifications can be made herein without departing from the scope of the invention as defined in the appended claims. For example, the oil level gauge guide device of the present invention can be applied to engines having a gauge insertion opening on the tip of a gauge insertion tube that extends to the oil pan. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An oil level gauge guide device comprising:

a guide body including a wide first open end and a narrow second open end with a plurality of slits extending longitudinally from a free edge of the second open end toward the first open end to separate the guide body into individually flexible sections; and a fastening portion including a first part and a second part coupled to the guide body, the first part being configured and arranged relative to the second oven end of the guide body to be coupled to a main engine body of an internal combustion engine in such a manner that the second open end is spaced by a prescribed gap from an oil level gauge insertion opening of the main engine body through which an oil level gauge is inserted.

2. The oil level gauge guide device as recited in claim 1, wherein the second open end of the guide body has an inner diameter that is smaller than the outside diameter of a cap part of the oil level gauge.

3. The oil level gauge guide device as recited in claim 1, wherein the guide body is constructed of a single, one-piece sheet metal that has been formed by bending.

4. The oil level guide gauge guide device as recited in claim 3, wherein the second open end has an inside dimension that is substantially equal to an inside dimension of the oil level gauge insertion opening when the oil level gauge is not installed.

5. The oil level gauge guide device as recited in claim 3, wherein the guide body includes three slanted surfaces that are bent and slanted such that the three slanted surfaces become closer to each other as the three slanted surfaces approach the second open end.

6. The oil level guide gauge guide device as recited in claim 5, wherein the second open end has an inside dimension that is substantially equal to an inside dimension of the oil level gauge insertion opening when the oil level gauge is not installed.

7. The oil level gauge guide device as recited in claim 3, wherein the first open end of the guide body has an upper rim with a first flange that extends outward therefrom.

8. The oil level gauge guide device as recited in claim 7, wherein the second open end of the guide body has a lower rim with a second flange that extends outward therefrom.

9. The oil level gauge guide device as recited in claim 3, wherein the second open end of the guide body has a lower rim with a flange that extends outward therefrom.

10. The oil level gauge guide device as recited in claim 1, wherein the first and second parts of the fastening portion are formed as a unitary, one-piece resin body.

11. An oil level gauge guide device comprising:

a guide body including a wide first open end and a narrow second open end; and a fastening portion including a first part and a second cart coupled to the guide body, the first part being configured to be coupled to a main engine body of an internal combustion engine in such a manner that the second open end faces an oil level gauge insertion opening of the main engine body through which an oil level gauge is inserted, the first and second parts of the fastening portion being formed as a unitary, one-piece resin body, the fastening portion further including
a metal collar disposed in the resin body, and
a mounting bolt coupled to the metal collar and configured to be fastened to the main engine body.

12. The oil level gauge guide device as recited in claim 11, wherein the fastening portion further includes a rotation stopping part configured to abut against the main engine body when the mounting bolt is tightened to secure the resin body to the main engine body.

13. The oil level gauge guide device as recited in claim 12, wherein the rotation stopping part is formed integrally with the resin body as a unitary, one-piece member.

14. The oil level gauge guide device as recited in claim 11, wherein the fastening portion further includes a metal ring with a claw part that is pressed into the resin body and configured to be disposed between the mounting bolt and the main engine body.

15. The oil level gauge guide device as recited in claim 11, wherein the guide body is constructed of a single, one-piece sheet metal that has been formed by bending.

16. The oil level gauge guide device as recited in claim 15, wherein the guide body includes a catching part that hooks onto the resin body of the fastening portion.

17. The oil level guide gauge guide device as recited in claim 15, wherein the second open end has an inside dimension that is substantially equal to an inside dimension of the oil level gauge insertion opening when the oil level gauge is not installed; and the guide body has a plurality of slits that extend toward the second open end.

18. The oil level gauge guide device as recited in claim 15, wherein the guide body includes three slanted surfaces that are bent and slanted such that the three slanted surfaces become closer to each other as the three slanted surfaces approach the second open end.

19. The oil level guide gauge guide device as recited in claim 15, wherein the guide body has a plurality of slits that extend toward the second open end.

20. The oil level gauge guide device as recited in claim 15, wherein the first open end of the guide body has an upper rim with a first flange that extends outward therefrom.

21. The oil level gauge guide device as recited in claim 15, wherein the second open end of the guide body has a lower rim with a second flange that extends outward therefrom.

22. An oil level gauge guide device comprising:

guide means for guiding an oil level gauge from a wide first open end of the guide means to a narrow second open end of the guide means during insertion an oil level gauge insertion opening of the main engine body of an internal combustion engine, the guide means including a plurality of slits extending longitudinally from a free edge of the narrow second open end toward the first open end to separate the guide means into individually flexible sections; and fastening means for fastening the guide means to the main engine body in a cantilever manner such that a free edge of the narrow second open end of the guide means is spaced by a prescribed gap from the oil level gauge insertion opening of the main engine body through which the oil level gauge is inserted.

23. An oil level gauge guide device comprising:

a guide body constructed of a single, one-piece sheet metal that has been formed by bending and including a wide first open end and a narrow second open end; and a fastening portion including a unitary, one-piece resin body having a first part with a bolt mounting bore and a second part coupled to the first open end of the guide body, the first part being configured to be coupled to a main engine body of an internal combustion engine in such a manner that the second open end faces an oil level gauge insertion opening of the main engine body through which an oil level gauge is inserted.

24. The oil level gauge guide device as recited in claim 23, wherein the guide body and the fastening portion are configured to form a prescribed gap between the second open end of the guide body and the gauge insertion opening.

25. The oil level gauge guide device as recited in claim 23, wherein the second open end has an inside dimension that is substantially equal to an inside dimension of the oil level gauge insertion opening when the oil level gauge is not installed; and the guide body has a plurality of slits extending longitudinally from a free edge of the second open end toward the first open end.

26. The oil level gauge guide device as recited in claim 23, wherein the guide body includes three slanted surfaces that are bent and slanted such that the three slanted surfaces become closer to each other as the three slanted surfaces approach the second open end.

27. The oil level guide gauge guide device as recited in claim 26, wherein the second open end has an inside dimension that is substantially equal to an inside dimension of the oil level gauge insertion opening when the oil level gauge is not installed; and the guide body has a plurality of slits extending longitudinally from a free edge of the second open end toward the first open end.

28. The oil level gauge guide device as recited in claim 23, wherein the first open end of the guide body has an upper rim with a first flange that extends.

29. The oil level gauge guide device as recited in claim 27, wherein the second open end of the guide body has a lower rim with a second flange that extends outward therefrom.

30. The oil level gauge guide device as recited in claim 23, wherein the second open end of the guide body has a lower rim with a flange that extends outward therefrom.

* * * * *